United States Patent
Khubani et al.

(10) Patent No.: US 6,848,731 B2
(45) Date of Patent: Feb. 1, 2005

(54) HINGE FOR EXTENDED GRABBER TOOL

(75) Inventors: Ashok Khubani, Boonton Township, NJ (US); Mahesh Lakhiani, Denville, NJ (US)

(73) Assignee: Ontel Products Corporation, Fairfield, NJ (US)

( * ) Notice: Subject to any disclaimer, the term of this patent is extended or adjusted under 35 U.S.C. 154(b) by 0 days.

(21) Appl. No.: 10/302,861

(22) Filed: Nov. 25, 2002

(65) Prior Publication Data
US 2003/0222467 A1 Dec. 4, 2003

Related U.S. Application Data
(60) Provisional application No. 60/384,820, filed on Jun. 4, 2002.

(51) Int. Cl.[7] .................................................. B25J 1/02
(52) U.S. Cl. ........................................ 294/19.1; 16/328
(58) Field of Search ............................... 294/19.1, 19.2, 294/24; 135/74; 16/324, 327, 328, 329, 331, 332, 353

(56) References Cited

U.S. PATENT DOCUMENTS

| | | | | |
|---|---|---|---|---|
| 3,448,486 A | * | 6/1969 | Wright | 16/324 |
| 3,527,492 A | * | 9/1970 | Hollis | 294/19.1 |
| 4,613,179 A | * | 9/1986 | van Zelm | 294/19.1 |
| 4,669,769 A | * | 6/1987 | Polder, Jr. | 294/19.1 |
| 4,962,957 A | * | 10/1990 | Traber | 294/19.1 |
| 5,577,785 A | * | 11/1996 | Traber et al. | 294/19.1 |
| 6,257,634 B1 | * | 7/2001 | Wei | 294/19.1 |
| 6,520,556 B1 | * | 2/2003 | Hsu | 294/19.1 |

* cited by examiner

Primary Examiner—Dean J. Kramer
(74) Attorney, Agent, or Firm—Andrew C. Aitken; Venable LLP

(57) ABSTRACT

An elongate engagement tool that has engagement elements located on a distal end of a first rod, a handle on the proximate end of second rod, a controller on the handle to control the engagement elements, and a linkage between the controller and engagement elements to control the engagement elements is disclosed. The rods are connected together by a locking hinge. A locking pin is received by the knuckles of the hinges has a plurality of axial segments. The profiles of the axial segments alternate from round disks to aster shaped disks that closely fit into the apertures formed by the knuckles. When the locking pin is moved to a first locked position where the aster shaped profiled sections are aligned with the apertures in the corresponding knuckles to the hinge is locked. Movement of the pin to a second free position where the round axial sections are aligned with the apertures in the knuckles provides for limited rotational movement.

15 Claims, 5 Drawing Sheets

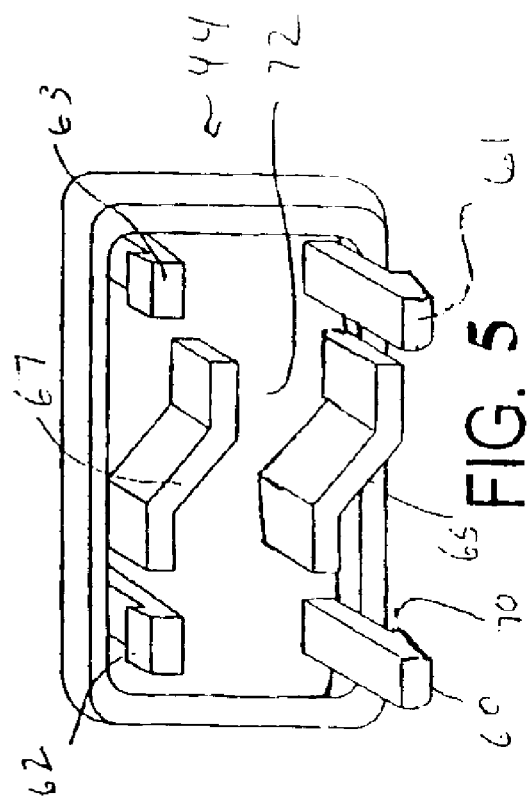
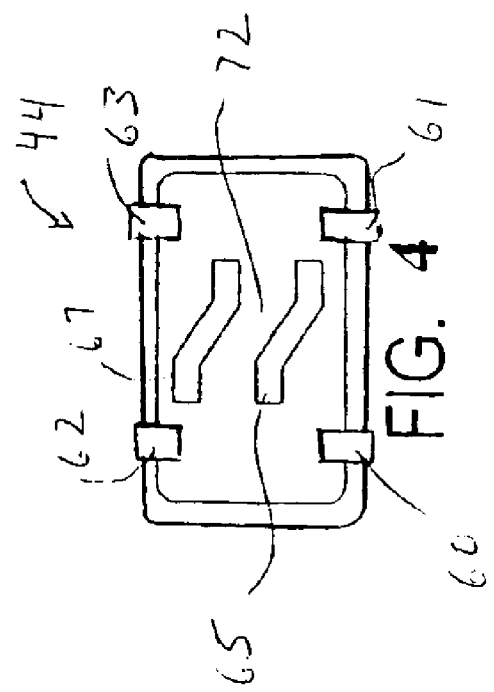

HINGE FOR EXTENDED GRABBER TOOL

This invention relates to an improvement for tools designed to engage objects from remote distances. The applicant claims the benefit of the filing date of U.S. Provisional Application No. 60/384,820, filed on Jun. 4, 2002.

BACKGROUND OF THE INVENTION

There are a wide variety of tools designed for picking up objects or manipulating objects from a distance. One common application for such tools is use by maintenance workers to pick-up debris for subsequent disposal. A tool with an elongate handle allows manipulation of the object without the need to bend over or to directly handle the material. Such tools are also useful for individuals that have physical handicaps that may impede their ability to bend over and reach the ground. There are also numerous household applications for such tools including retrieval of materials from high shelves or from under furniture. Another common application for such tools is for changing light bulbs from recessed lighting fixtures. Another entire class of devices that operate in a similar manner and perform a similar function as the pick-up tools described above are marketed as toys. Other tools may have blades on the distal end for cutting that may be used for a wide range of uses including those tolls used in the surgical field and tools used for trimming high branches.

Common elements that are shared by such devices that are addressed by the improvement disclosed herein include (1) an elongate shaft having (2) a handle on one end and, (3) engagement elements on the opposite end, (4) a controller element on the handle and (5) a linkage from the controller element to the engagement elements. The user of the these tools may manipulate a controller, such as a lever or trigger, that is provided on the handle end of the device to operate the engagement elements that are provided on the opposite end of the elongate shaft. The engagement elements may include arrangements such as claws, arms, scoops, calipers, tongs, blades or cups. In typical designs, the control lever pulls an internal linkage that draws together the engagement elements that are biased apart by springs.

Exemplary arrangements of such devices are disclosed in the U.S. Pat. No. 4,962,957 (the "'957 Patent"), U.S. Pat. No. 4,709,839 (the "'839 Patent"), U.S. Pat. No. 3,527,492 (the "'492 Patent"), U.S. Pat. No. 4,613,179 (The '179 Patent), U.S. Pat. No. 4,669,769 (the '769 Patent) and U.S. Pat. No. 6,257,634 (the '634 Patent). A desirable feature that is sometimes incorporated on these devices is a locking mechanism that enables the engagement elements to be retained in a fixed position. A locking features allows a user of the device to retain the engagement elements in a closed position and in contact with an object and thereby allow a user to release pressure on the controller while maintaining control over the object. Consequently, a user can use his or her free hand to further manipulate the object, either directly, or indirectly by using the elongate shaft. Allowing the user to release pressure on the controller yet maintain engagement of the object also adds a convenience feature.

There have been a number of alternative manners to accomplish locking engagement elements on grabber tools that are disclosed in the prior art. For example, the patent to Moyer, U.S. Pat. No. 1,120,735, discloses a segment that can be that can be manipulated by a lever that in turn may be secured in place by a pawl. The pawl is biased against the ratchet segment by a leaf spring. The '957 patent discloses an alternative manner in which to lock the engagement elements of a pick-up tool that allows the trigger to be released while maintaining pressure on the object. U.S. Pat. No. 5,823,590 to Forrest et al. discloses yet another alternative method of locking the engagement elements thereby allows a user to manually secure the central linkage in fixed position. U.S. Pat. No. 6,438,891 to Aboczky provides a spring locking mechanism.

While, there exist numerous types of devices and a variety of alternative manners in which to lock engagement elements in fixed positions, many of the efforts disclosed in the prior art have involved fairly complex arrangements and require multiple parts. In general, increased complexity of a proposed device is associated with increased expense in connection with manufacturing and with respect to the costs of the parts required to achieve the feature. Accordingly, there continues to remain a demand and a commercial market for devices that have a simple and inexpensive locking arrangement.

A further desirable feature to provide with elongate engagement tools is the ability for the device to fold or collapse. Because these devices employ an elongate rod, the devices are somewhat cumbersome in connection with shipping, handling, display and storage. While it is desirable to provide a manner in which to collapse the device, the manner in which the collapse is affected must accommodate the linkage between the controller and engagement elements and must also maintain sufficient strength to support objects when the elongate member is in an extended position. While the prior art has recognized this need, there remains room for improved alternative and effective manners to achieve these goals. In this regard, for example, U.S. Pat. No. 4,613,179 relies upon a stop pin 71 that is designed to work only when the device is in an upright position. U.S. Pat. No. 5,823,590 discloses a telescopic arrangement to collapse a grabber device. U.S. Pat. No. 4,231,603 discloses a grabber device with a hinge fixture that allows the proximal and distal ends of an elongate rod to be aligned in different directions.

It is an object of the present invention to provide a new locking arrangement for the engagement elements of a pick-up tool that is simple to manufacture and assemble and that uses only a few parts. A further object of the present invention is to provide an engagement device that has a locking device that can be easily manipulated by the user. A further objective of the invention is to provide a locking hinge on the elongate arm or rod that allows the devices to fold yet maintain strength when in an extended position.

SUMMARY OF THE INVENTION

The present invention relates to both a new locking arrangement and a folding hinge structure for the engagement of such devices described above. The invention allows the user of such a device to engage an object and then manipulate a sliding switch to lock the engagement elements in a fixed position. The switch causes a stop member, oriented in a direction transverse to the switch, to engage a control surface and prevent movement of the controller. The switch is provided on the handle so that it can be manipulated by the user's thumb while he or she operates the controller for the device. The control surface is fixed and integrated with the controller that controls the engagement elements that are positioned on the opposite end of an elongate rod.

The device also incorporates a hinge feature on the elongate rod that enables the elongate arm to be folded in half so that the device may be shipped and stored conveniently. The hinge, which is provided at a midpoint along the elongate rod, does not significantly diminish the strength of the rod. The hinge uses a pin that has axial sections that alternate from sections having a circular profile to sections having an aster shaped profile. The pin may be aligned in a first locked position wherein the aster shaped segment fit into corresponding aster shaped cavities within the knuckle that prevents the leaves from movement. The pin may be positioned to occupy an alternate second position wherein the sections of the pin having a round profile is aligned in the aster profiled cavity thereby allowing the leaves to pivot with respect to each other.

BRIEF DESCRIPTION OF THE DRAWINGS

FIG. 4 is a bottom view in elevation of the switch element used with the locking feature of the invention;

FIG. 5 is a perspective view of the switch element used with the locking feature of the invention;

DETAILED DESCRIPTION

Figure 1:
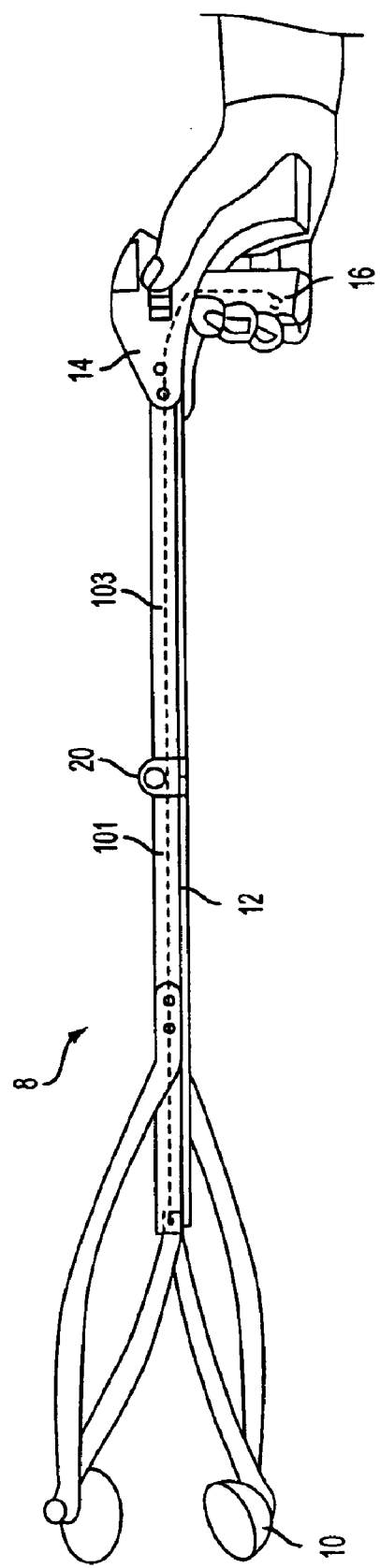
FIG. 1 is a perspective view of the pick-up device according to the invention with a schematic representation of a linkage.
Figure 2:
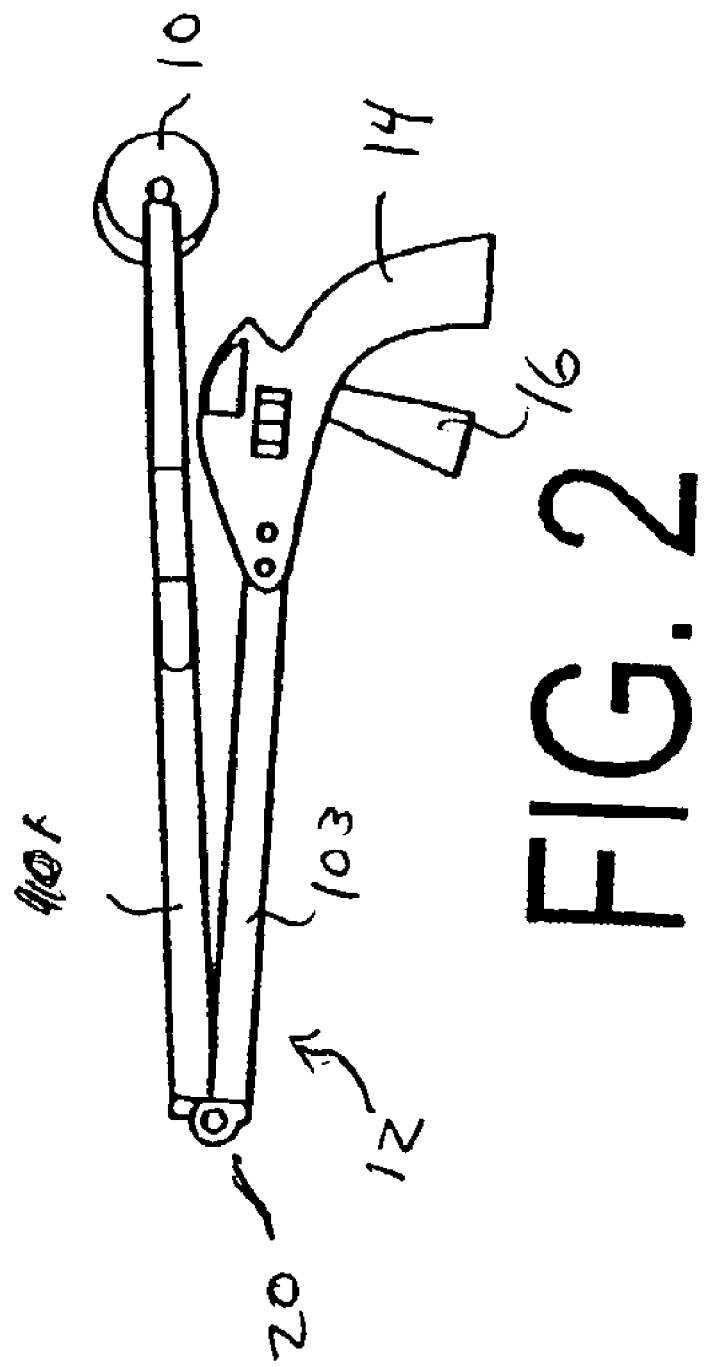
FIG. 2 is a perspective view of the device shown folded about the hinge.

Now referring to FIG. 1, a preferred embodiment of the elongate grabber tool 8 is depicted in an extended position. Grabber tool 8 incorporates engagement cups 10 on a distal end of a elongate hollow rod 12 and a pistol grip 14 on the opposite proximal end. A trigger 16 is provided adjacent to pistol grip 14 for manipulation by a user's fingers. As shown on the side of pistol grip 14, a switch 18 is provided that effects a locking feature of the engagement elements of the device. At a medial point on elongate hollow rod 12 is hinge 20 that allows elongate rod 12 to fold. FIG. 2 depicts the rod in a folded position wherein the distal end of elongate rod 12 is folded back on the top side and adjacent to pistol grip 14.

Figure 3:
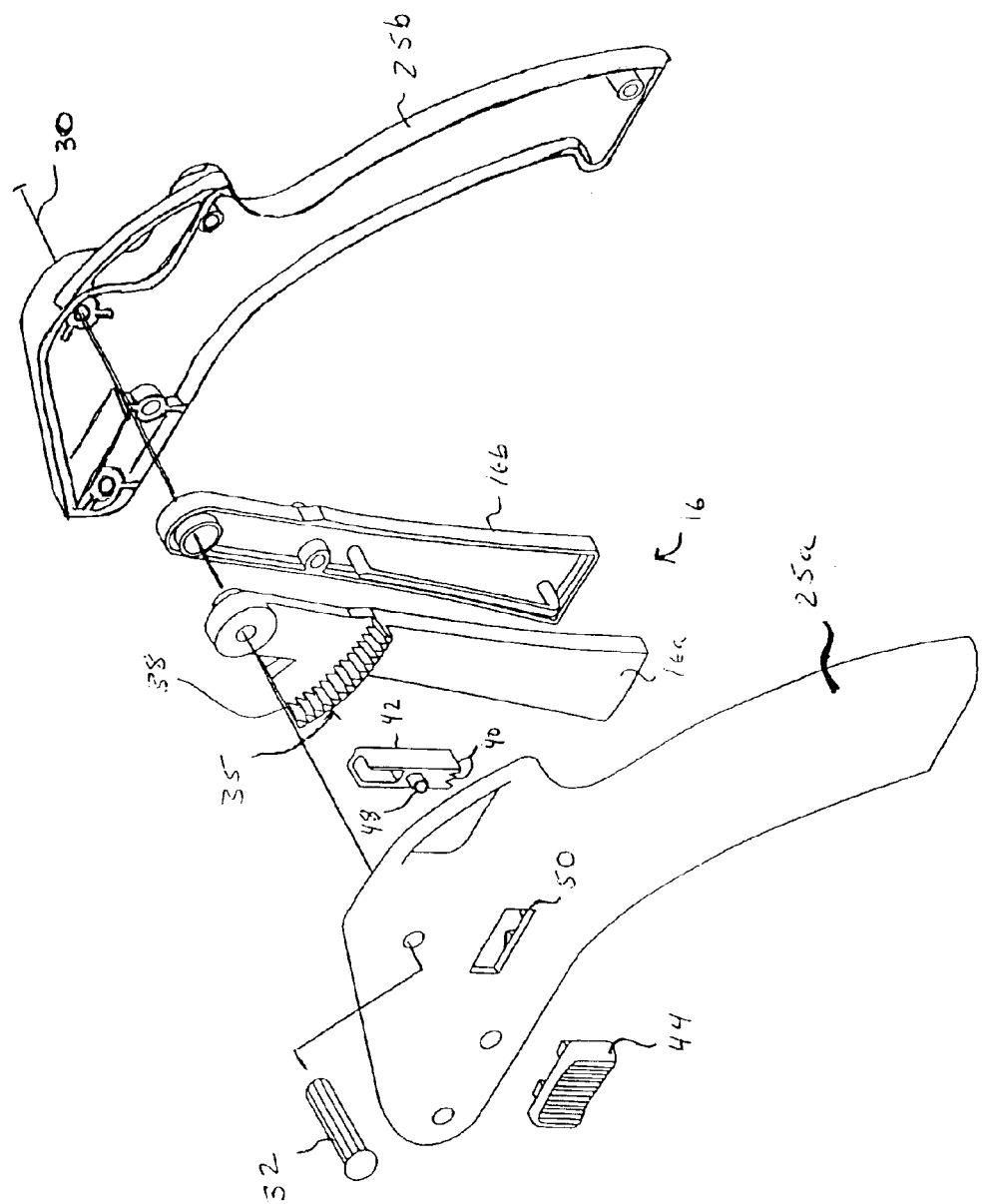
FIG. 3 is an exploded view of the handle of the invention.

Now referring to FIG. 3, trigger 16 extends from and is connected to the handle at axis or pivot point 30 that is located near the top of the pistol grip 14. A connecting pin 32 transects handle side 25a, the trigger half 16a, trigger half 16b and handle side 25b. Trigger 16 extends through a slot or opening provided between the forward sides of pistol grip 14 and allows for limited pivotal movement with respect to the axis 30. As seen on trigger side 16b, a cavity is provided to retain a nipple (not shown) which is provided on the end of a cable (not shown) that connects trigger 16 to the engagement elements on the distal end of the tool. The engagement elements, which are biased apart by spring members 31 are drawn together by pulling connector members 29 toward the handle 14 via the central cable. Control surface 35 is an arcuate notched surface that is integral with trigger half 16a and on which is provided a series of saw-tooth notches 38. The arc is formed so that each saw tooth extension is approximately equidistant to the pivot point 30. The notches 38 are adapted to receive the end projections 40 of a stop member 42. Stop member 42 is engaged or disengaged by the lateral manipulation of switch 44. Stop member 42 also is provided with a pin member 48 that is engaged by switch 44. Stop member 42 can be disengaged by either movement of the switch in the opposite direction or by application of a force against the trigger that will push the stop member from its position. Stop member 42 is locked into place and in engagement with notches 38 on the arcuate control surface 35 by use of a mechanical locking engagement wherein switch 44 stays in position by frictional engagement.

FIGS. 4 and 5 depict the rear side of switch 44. As best seen in FIG. 5 extensions 60, 61, 62 and 63 have a projections that extend laterally away from the extensions so that the switch 44 will snap fit into opening 50 and be retained within the opening. For example, surface 70 of projection 60 will engage the interior surface of the handle side 25a adjacent to the opening 50. Since the projections only extend toward the top and bottom of the switch, the arrangement allows for the lateral movement of the switch 44 within opening 50. Walls 65 and 67 define groove 72 into which the pin member 48 of stop member 42 is received. Lateral movement of switch causes the side walls 65 and 67 to move pin 48 thereby causing the stop member to move up or down and in or out of engagement with the control surface 35.

In operation, a user can use the device in a manner that allows free movement of cups or, by manipulation of the switch can cause the stop member to engage the notches on the trigger and therefore lock the movement of the device. The stop member can be disengaged by pulling on the trigger, which forces the teeth 40 of stop member 42 out of engagement with the opposite teeth 38 on control surface 35. The teeth 40 may also be disengaged from the opposite teeth 38 on control surface 35 by lateral movement of switch 44.

While an integral saw-toothed notched control surface 35 is depicted as a preferred embodiment, it is contemplated that other arrangements could be advantageously employed to lock the trigger. For example, a side view of the control surface could resemble a round or square waveform that has an opposite and complementary profile of teeth provided on a stop member. In a further contemplated embodiment, the control surface may be comprised of a series of cavities that have sidewalls oriented transverse to the control surface and the stop member includes an extension that can be received in the cavities. For example, in this alternative contemplated embodiment, a series of annular cavities are provided on the control surface that can receive a peg that extends from the stop member. In yet further contemplated embodiments of the invention the stop member is made of conical shaped projections or pyramid shaped projections that are received in opposite and complementary shaped cavities.

The locking arrangement according to the invention uses only a few parts and can therefore be economically manufactured and assembled. As described herein, the locking feature further allows for the stop member to engage the control surface along the entire range of motion of the control surface 35 and range of the trigger 16. The switch for the lock can be manipulated by the user's thumb while the handle 25 of the device is held in the user's hand.

While the controller depicted in the preferred embodiment is a trigger designed to be engaged by multiple fingers of the user, the applicant contemplates that alternative arrangements of the trigger or controller may also be provided. For example, in an alternative embodiment the trigger may be manipulated by a user's single finger. In yet another contemplated alternative embodiment, the trigger may be displaced on the rear side of the stationary handle. Further, while in the preferred embodiment the engagement elements are opposite engagement cups, it is also contemplated that other engagement elements may also be used and that may depend on the intended application.

Figures 6, 7, 8:
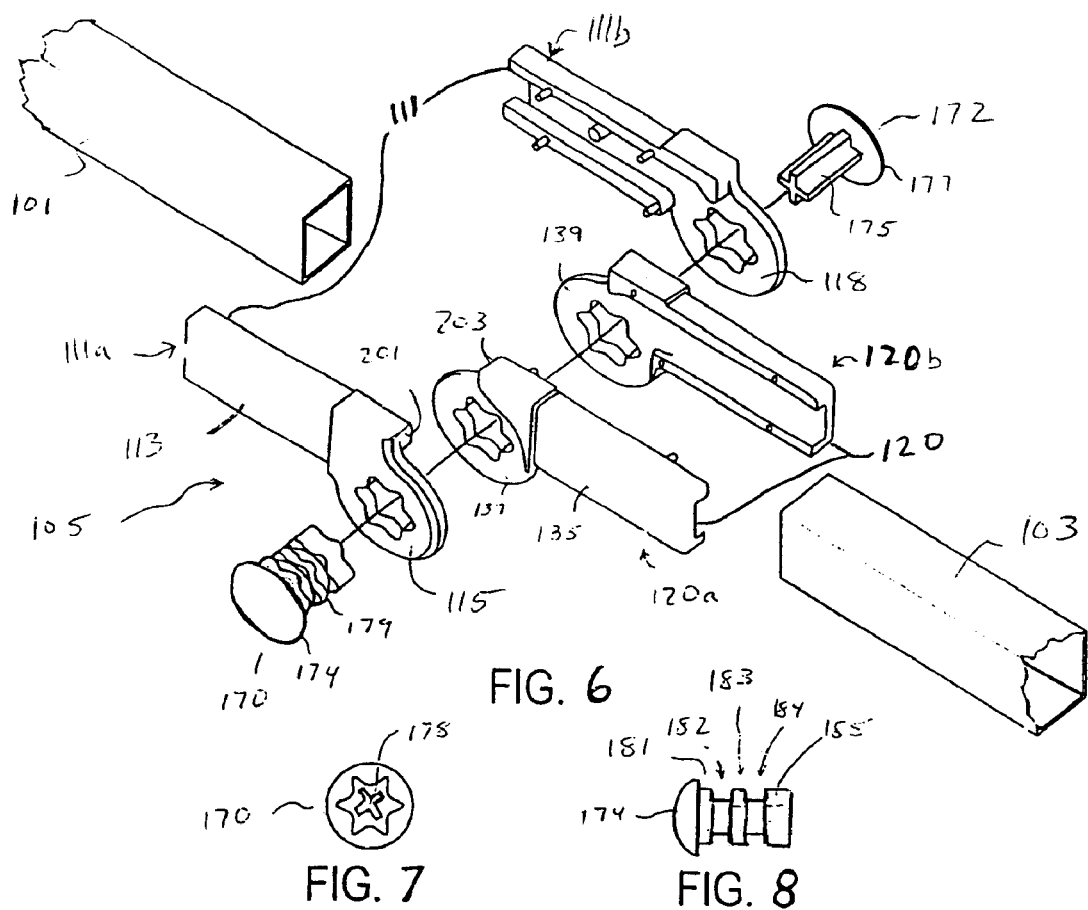
FIG. 6 is an exploded view of the hinge element of the invention.
FIG. 7 is a bottom view of the exterior segment of the pin used with the hinge element of the invention.
FIG. 8 is a side view in elevation of the exterior segment of the pin used in connection with the hinge element of the invention.

As best shown in FIG. 6, in a preferred embodiment of the invention the elongate shaft is provided in two sections, a distal section 101 and a proximal section 103. The distal section 101 and the proximal section 103 are connected by a locking hinge structure 105 that enables the device to be folded. Hinge 105 includes a forward hinge section 111 composed of opposite halves 111a and 111b and a rearward section 120 composed of opposite halves 120a and 120b. Halve 120 includes a shank 135 and two flat knuckle sections 137 and 139 that extend from shank 135. Separating knuckle section 137 from section 139 is a gap that has an axial dimension about the same distance as the as the width of one of the respective knuckles. This distance is also approximately the same as the length of sections 182 and 184 of the hinge pin.

The knuckle sections 115 and 118 extend from the distal end of the hinge segment 111 and are positioned on the exterior lateral sides of the hinge. When assembled, sections 115 and 137 are adjacent to one another and define a portion of an axial channel that extends transverse to the direction of the elongate rod. When the grabber device is in its extended position, wall 201 comes into contact with wall 203 and prevents further rotation in one direction.

The hinge pin is made of exterior section 170 and a retention member 172. Retention member includes rounded head section 172 on the end of shank member 175. Shank member 175 of retention member 172 is received in opposite and complementary cavity 178 that is provided in the exterior section 170. As seen in FIGS. 7 and 8 the exterior shank section 179 has a number of sections along its axial length. As best seen in FIG. 7, a bottom view of the exterior section 170, section 185 has an aster or "star shaped" axial section. Sections 183 and 181 of the pin have the same star shaped profile. Separating the star shaped sections are sections 182 and 184 that have circular or round axial sections. As best seen in FIG. 6 the exterior section of the pin is inserted through the axial cavity formed when the knuckles are aligned.

The arrangement described above allows the hinge pin to be positioned in alternative positions including a first position wherein the rounded axial sections 182 and 184 of the pin are aligned within knuckle sections 137 and 139. In this first position the hinge section is allowed to rotate about the pin. Application of pressure on the rounded head allows the pin to be moved in an axial direction through the channel to a second position where the are locked with respect. In the locked position the star shaped axial sections 181, 183 and 185 of pin 170 are aligned within the aster shaped cavities defined by the knuckles 115 137 139 and 118. In this position the front leaf section does not move with respect to the rearward leaf section section.

The hinge allows the device to be positioned in the extended position as depicted in FIG. 1 or in the folded position as depicted in FIG. 2. When the device is in the extended position, the hinge may be locked into position wherein the hinge leaves are fixed with respect to one another.

While the preferred embodiments have been described herein, those skilled in the art will recognize that certain details may be changed without departing from the spirit and scope of the invention. Thus, the foregoing specific embodiments and applications are illustrative only and are not intended to limit the scope of the invention. It is contemplated that the invention will functional and effective in diverse applications where it is desirable to lock elements that are designed to engage or otherwise manipulate objects from a remote distance. Likewise, although the locking hinge structure is particularly useful in connection with elongate grabber tools, the hinge may also be employed on other rod statures where there is need.

We claim:

1. An improvement for elongate tools that are designed to engage objects from remote distances and more particularly those tool that have engagement elements located on a distal end of a first rod, a handle on a proximate end of a second rod, a controller on said handle to control said engagement elements, and a linkage between said controller and said engagement elements to control said engagement elements, said improvement comprising providing a two part rod, said rod connected together by a locking hinge, said locking hinge located at a medial position between said engagement elements and said handle, and said locking hinge further comprising:

a first hinge segment comprising a leaf section and an opposite first knuckle, said first knuckle having opposite first and second annular extensions for reception of a hinge pin and said first and second annular extensions located a predetermined distance apart from one another, said leaf section adapted to be affixed to said distal end of said rod, a second hinge segment said second segment also comprising a leaf section and an opposite second knuckle having a third and fourth annular extension for receiving a hinge pin, said leaf section adapted to be affixed to said proximal end of said rod, and said first and said third annular extension located adjacent to one another and defining a first knuckle pair and said second and said fourth annular extension located adjacent to one another and defining a second knuckle pair and said first and second knuckle pairs defining a central aperture, said aperture defining an opening that is not round, wherein said first and said second knuckle pairs are positioned a predetermined distance apart from one another thereby defining a central gap, and a locking hinge pin, said locking hinge pin adapted to be received by said knuckle pairs and further comprising a plurality of axial segments, each segment having a width the same distance as said central gap and wherein two of said segments are round and spaced the same distance apart from one another as the distance separating said third and fourth annular extensions on said second hinge segment and the remainder of said segments have an axial section that are not round and can closely fit into the apertures formed by said knuckle pairs, wherein said locking hinge pin can be moved in rectilinear fashion into a first locked position wherein said not round axial profiled sections of said locking pin are aligned with the apertures in said knuckle pairs and a second free position wherein said round axial sections are aligned with said apertures in said third and fourth annular extensions and thereby provide for limited rotational movement.

2. The improvement for elongate tools as recited in claim 1 and further comprising locking hinge pin retaining means, said locking hinge pin retaining means comprising a head and shaft and said shaft is axially received in said locking hinge pin.

3. The improvement for elongate tools as recited in claim 2 further wherein said locking hinge pin retaining means engages and holds said locking hinge pin by frictional engagement.

4. The improvement for elongate tools as recited in claim 2 wherein said locking hinge pin has a domed shaped head and said head of said locking hinge pin retaining means is dome shaped.

5. The improvement for elongate tools as recited in claim 2 wherein said first and second rods have axial sections that are polygons.

6. The improvement for elongate tools as recited in claim 1 wherein said apertures in said knuckle pairs and said non round sections of said locking hinge pin are star shaped.

7. The improvement for elongate tools as recited in claim 1 wherein said leaf sections further comprises a shank, said shank is adapted to be received within said first and second rods.

8. The improvement for elongate tools as recited in claim 7 wherein said linkage passes through said shanks and said central gap.

9. The improvement for elongate tools as recited in claim 7 wherein said shank further comprises a flange section, said flange section having a dimension larger than an opening in said first and second rods wherein said flange engages an endwall of one of said first or second rods and axial movement thereby limited.

10. The improvement for elongate tools as recited in claim 1 wherein said first, second third and fourth annular extensions further comprise four planar disk sections of approximately equal thickness.

11. The improvement for elongate tools as recited in claim 1 wherein said linkage comprises a cable.

12. The improvement for elongate tools as recited in claim 11 wherein said linkage is contained within said first and said second rod.

13. The improvement for elongate tools as recited in claim 1 wherein said engagement elements comprise opposite cups.

14. A locking hinge for connecting a first and second rod comprising
- a first hinge segment comprising a leaf section and opposite first knuckle sections, said first knuckle section further comprising two tubular sections said tubular sections located a predetermined distance apart from one another, said leaf section adapted to be affixed to a first rod,
- a second hinge segment said second segment also comprising a leaf section and opposite second knuckle section, said second knuckle section further comprising two tubular sections and said tubular sections oriented a predetermined distance apart from one another, said leaf section adapted to be affixed to an end of a said second rod,
- said first and second knuckle sections aligned directly adjacent to one another wherein the tubular sections of said first knuckle are aligned adjacent to the tubular sections of said second knuckle and said adjacent tubular sections thereby defining a first knuckle pair and a second knuckle pair
- and said knuckle pairs defining a central aperture, said aperture defining an opening that is not round,
- wherein said first and said second knuckle pairs are positioned a predetermined distance apart from one another thereby defining a central gap, said central gap having a fixed distance,
- and a locking pin, said locking pin adapted to be received by said knuckle pairs and further comprising a plurality of axial segments, each segment having an axial length the same distance as said fixed distance of said central gap and wherein a number of said segments are round and spaced the same distance apart from one another as the tubular sections and the remainder of said segments have an axial section that are not round and can closely fit into the apertures formed by said knuckles,
- wherein said locking pin can be moved in rectilinear fashion into a first locked position wherein said not round axial profiled sections of said locking pin are aligned with said apertures in said corresponding knuckles and a second free position wherein said round axial sections are aligned with said apertures in said knuckles and thereby provide for limited rotational movement.

15. The locking hinge recited in claim 14 wherein said non round apertures and said non-round axial profiled sections on said locking pin are star shaped.

* * * * *